United States Patent [19]

DiGrande et al.

[11] Patent Number: 5,043,588

[45] Date of Patent: Aug. 27, 1991

[54] PELLET DIAMETER MEASUREMENT APPARATUS AND METHOD DETECTING NON-ORTHOGONALLY TO THE COMMON AXIS OF THE PELLETS

[75] Inventors: John T. DiGrande, Columbia; David V. Lambert, St. Matthews, both of S.C.

[73] Assignee: Westinghouse Electric Corp., Pittsburgh, Pa.

[21] Appl. No.: 540,041

[22] Filed: Jun. 18, 1990

[51] Int. Cl.$^5$ .............................................. G01N 21/86
[52] U.S. Cl. ...................................... 250/560; 356/386
[58] Field of Search ................ 250/560, 563; 356/384, 356/385, 386, 387

[56] References Cited

U.S. PATENT DOCUMENTS

| | | | |
|---|---|---|---|
| 3,609,368 | 9/1971 | Knorr et al. | 250/308 |
| 4,349,112 | 9/1982 | Wilks et al. | 250/223 R |
| 4,448,680 | 5/1984 | Wilks et al. | 250/223 R |
| 4,749,870 | 6/1988 | Schmaltuss et al. | 250/560 |
| 4,895,449 | 1/1990 | Marshall | 356/385 |
| 4,991,308 | 2/1991 | Donaldson | 356/384 |

*Primary Examiner*—David C. Nelms
*Assistant Examiner*—Que T. Le
*Attorney, Agent, or Firm*—J. C. Spadacene

[57] ABSTRACT

An pellet diameter inspection system has a laser scanning apparatus for measuring and detecting the outside diameter of the pellets and an apparatus for transferring pellets past the laser scanning apparatus. A stationary support track aligns and guides pellets in a row along a linear path past the laser scanning apparatus with the pellets being advances along the path by the transfer apparatus operating through forward and reverse strokes. The laser scanning apparatus includes a laser beam light source and receiver disposed on opposite sides of the linear path in a non-orthogonal orientation to the common axis of the aligned pellets and operable for respectively emitting and receiving a laser beam directed across the pellets along a directional path extending in a non-orthogonal orientation to common axis of the pellets which will eliminate detection of adjacent ends of the pellets in the row.

11 Claims, 9 Drawing Sheets

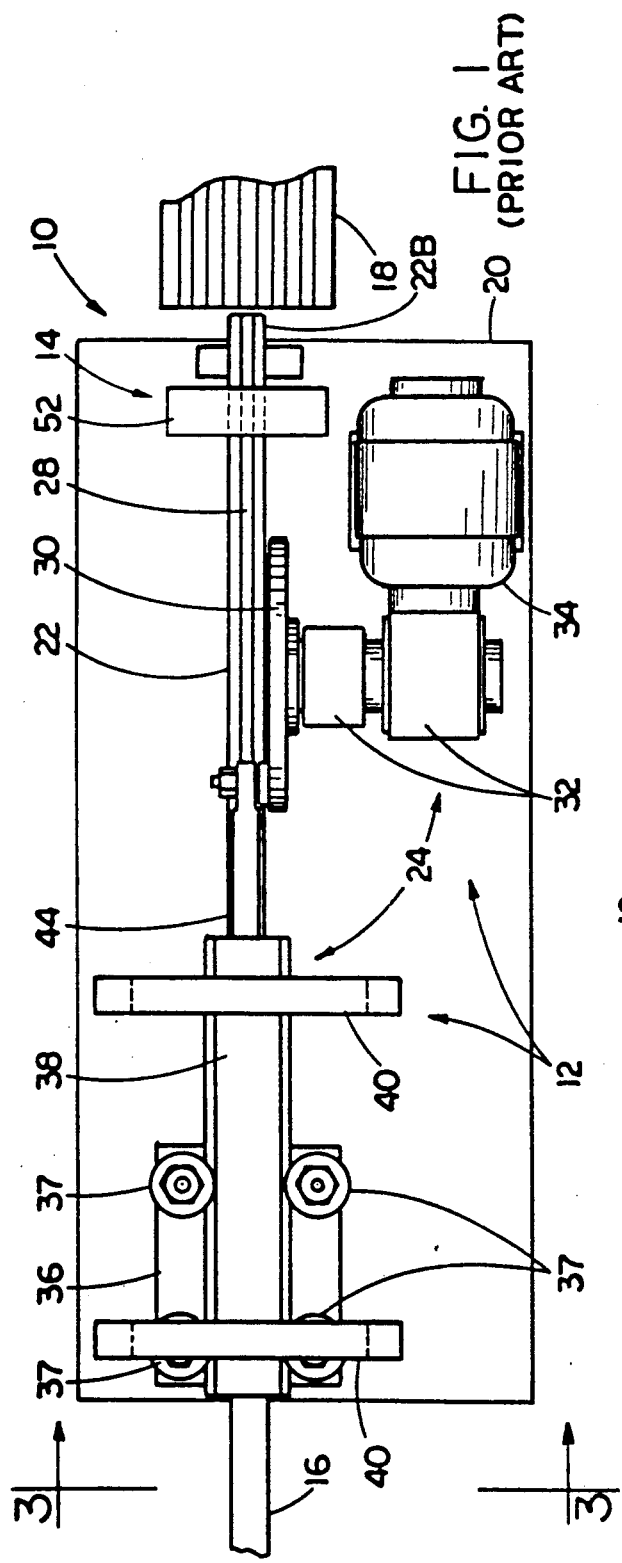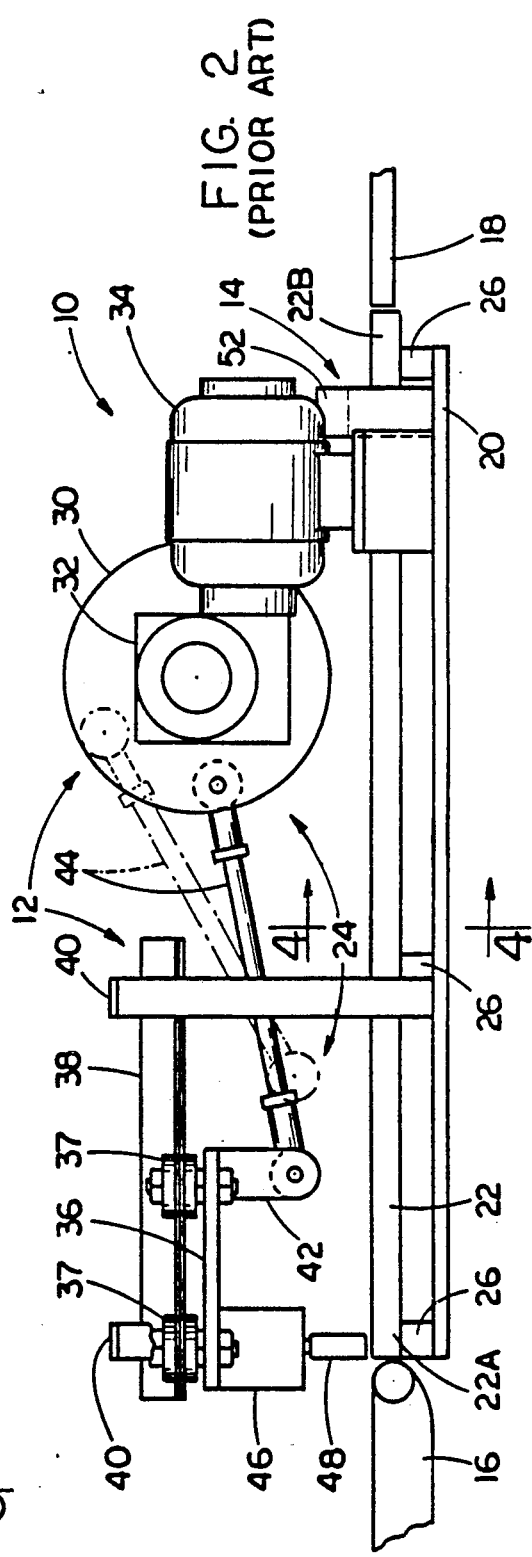
FIG. 1 (PRIOR ART)
FIG. 2 (PRIOR ART)

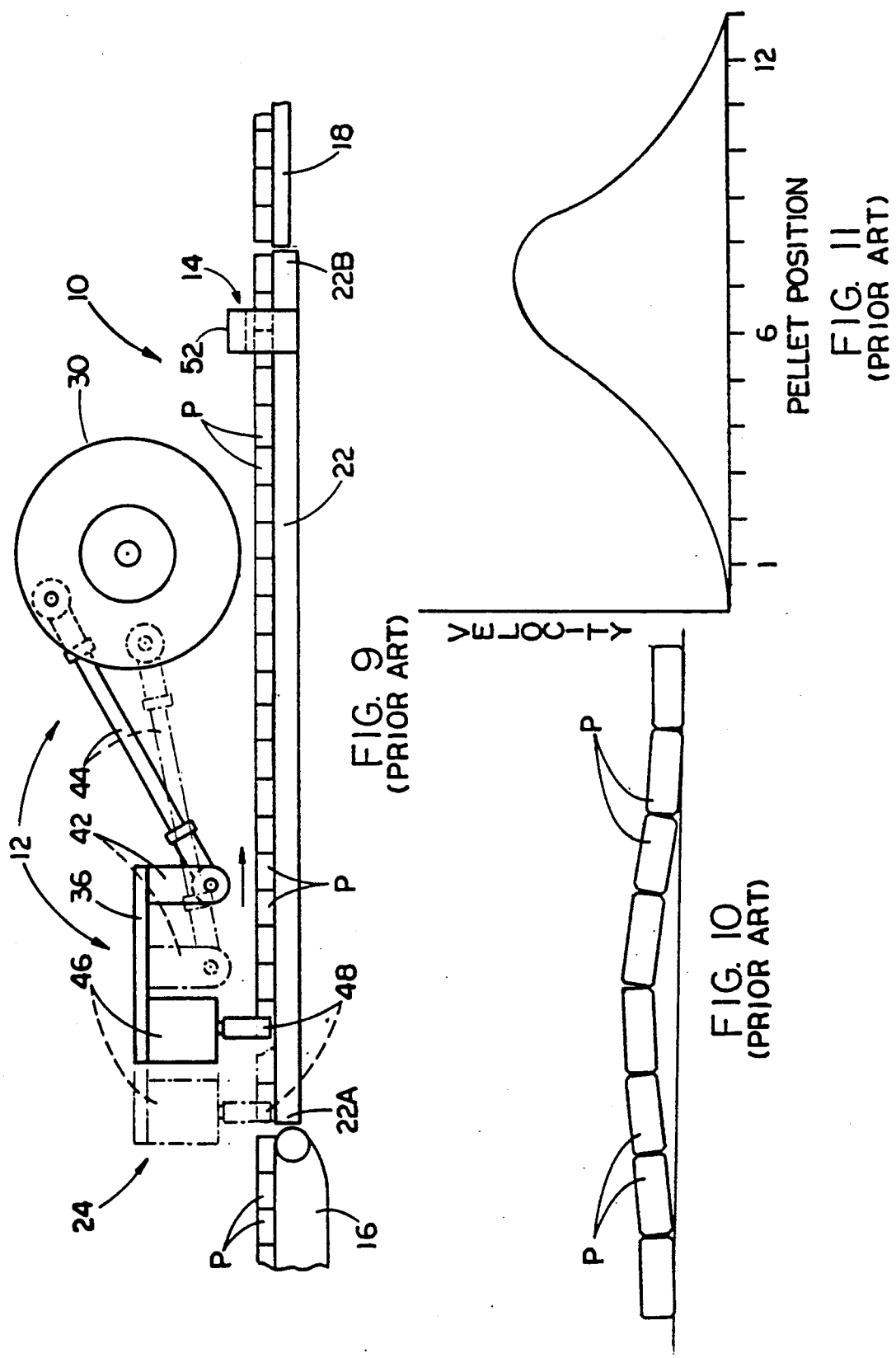

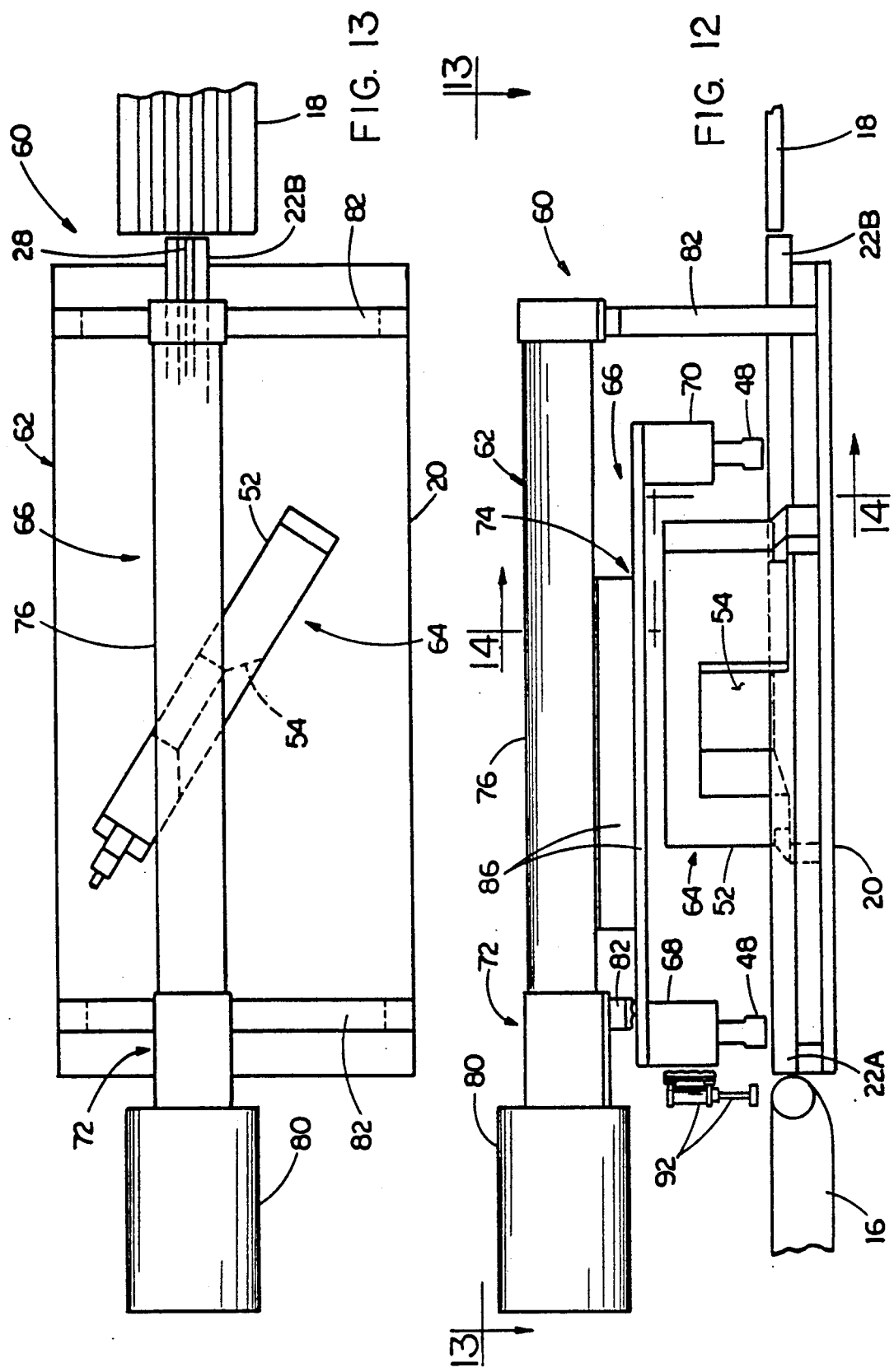

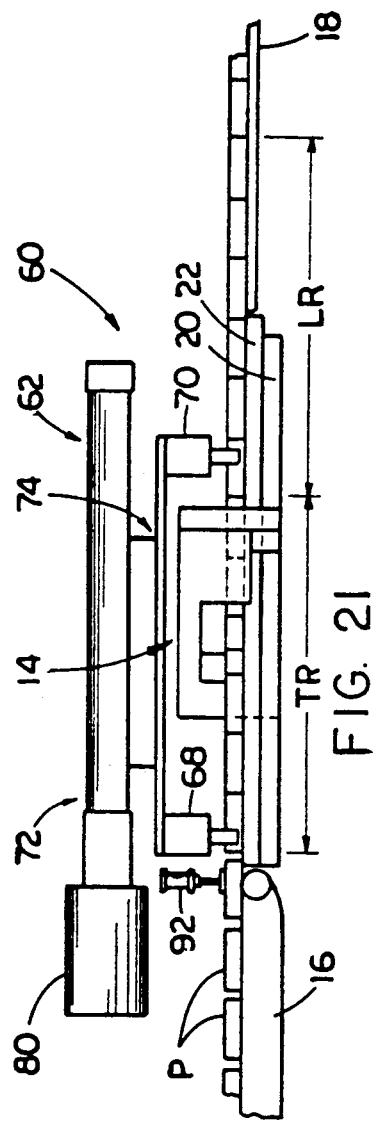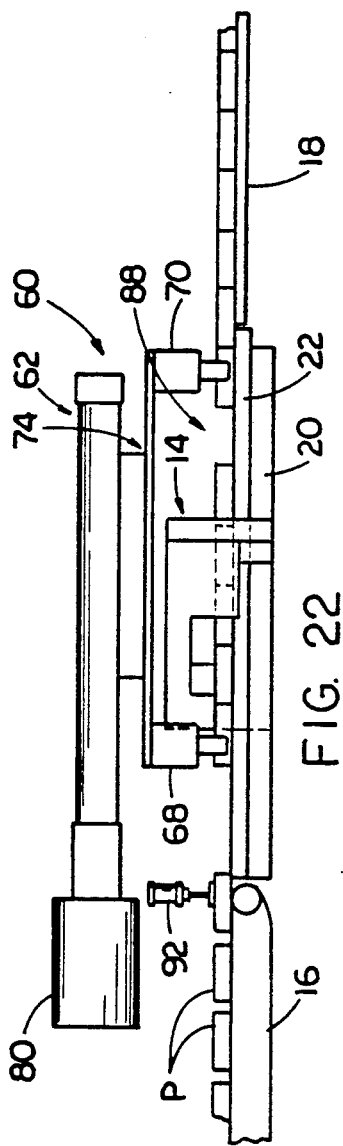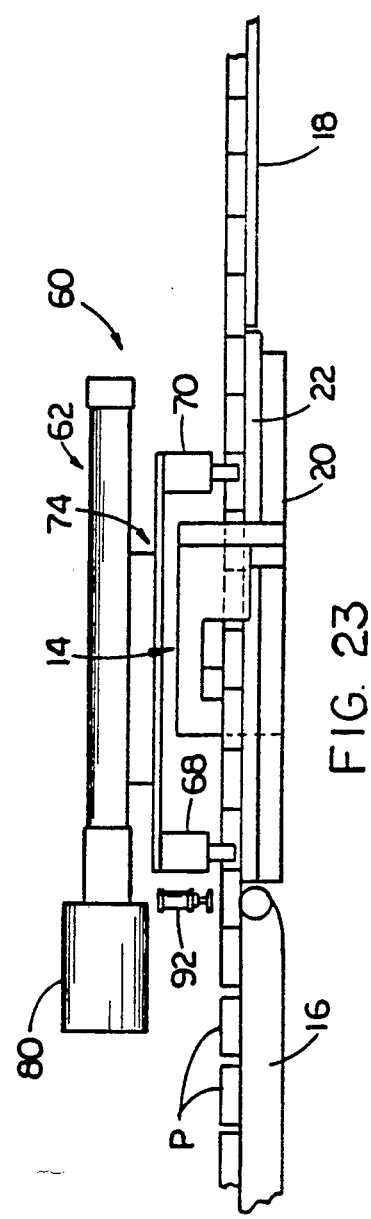

PELLET DIAMETER MEASUREMENT APPARATUS AND METHOD DETECTING NON-ORTHOGONALLY TO THE COMMON AXIS OF THE PELLETS

CROSS REFERENCE TO RELATED APPLICATION

Reference is hereby made to the following copending application dealing with related subject matter and assigned to the assignee of the present invention: "Pellet Transfer Apparatus And Method" by John T. DiGrande, assigned U.S. Ser. No. 07/536,926 and filed June 12, 1990.

BACKGROUND OF THE INVENTION

1. Field of the Invention

The present invention relates generally to nuclear fuel pellet diameter inspection, and more particularly, to an apparatus and method for laser scanning of pellets to measure pellet diameter in a pellet production line.

2. Description of the Prior Art

A nuclear fuel pellet having an oversize or undersize diameter can greatly affect the efficiency and cost of manufacturing nuclear fuel rods. The oversize diameter pellet may clog the entry to the fuel rod, requiring the operator to turn off the pellet feeding apparatus, pull out the oversize pellet, and/or replace the affected fuel rod. This corrective measure wastes considerable manufacturing time.

Additionally, an oversize fuel pellet can cause premature and costly replacement of a nuclear fuel rod in the reactor core at a nuclear power plant. If a pellet is too large, the pellet-to-clad gap is reduced, leading to excessive clad stresses and potential fuel rod failure during core operation. On the other hand, undersize pellets reduce fuel rod efficiency due to lack of optimum amount of fuel within the rod.

In the past, diameters of pellets have been checked at random at two separate stages of the manufacturing process. First, one pellet per tray is inspected for diameter oversize/undersize with a hand micrometer by quality control personnel, and the official results are recorded. Second, the pellets are inspected at random with a hand operated micrometer by an operator as the pellets exit the grinding station. The tolerance for pellet diameter is plus or minus 0.0005 inch from nominal. Such measurements are noted but not recorded by the operators; they are merely used to ensure proper grinder adjustment.

More recently, a desire has grown to inspect 100% of the pellets produced, instead of conducting random tests. One inspection system presently being used employs a pellet transfer apparatus in conjunction with a laser scanning apparatus for scanning pellets with a laser beam to measure and detect oversize and undersize ones as they are moved, arranged end-to-end in a single file row, from the grinding station to a pellet storage tray. However, this system has several drawbacks which prevent it from achieving satisfactory inspection results.

One drawback is that to move the long pellet row the pellet transfer apparatus has to push the row by gripping the rearmost pellet in the row. Pushing from the rear of the pellet row typically produces upward buckling of some of the pellets at the middle of the row. Such buckling results in inaccurate diameter measurements and a false indication of oversize pellets.

Another drawback is that the pellet transfer apparatus employs a rotating flywheel connected peripherally by a link to a reciprocable carriage to drive the carriage and a pellet gripping mechanism mounted thereon through drive and return strokes. The constant rotary motion of the flywheel is converted into a reciprocable motion of the carriage having a non-uniform or non-constant velocity. Pellets in the middle of the pellet row move past the laser at a higher speed than at the opposite ends such that the laser may only achieve one measurement for each middle pellet.

Thus, not all pellets move past the measuring laser at the same speed which diminishes the accuracy in and number of readings taken. Since it only takes a localized oversize diameter condition on one of the pellets to cause problems in its subsequent insertion into the fuel rod and in increasing clad stresses, a decrease in the number of readings is just the opposite of what is desired.

A further drawback is that the beam of the laser is aligned perpendicular to the axes and the direction of travel of the pellets. Such orientation permits the chamfers on the opposite ends of adjacent pellets to show up as a reduced or undersize pellet diameter thereby giving false readings. Chamfers may reduce a nominal diameter reading by as much as 40 mils if the scanner emits a laser beam perpendicular to the central axis of the pellet.

Consequently, a need exists for a different way to transfer pellets and measure pellet diameters so as to avoid the above-mentioned drawbacks.

SUMMARY OF THE INVENTION

The present invention provides a laser scanning pellet diameter measurement apparatus and method which are part of an improved pellet inspection system designed to overcome the above-described drawbacks and satisfy the aforementioned needs. In addition to the laser scanning pellet diameter measurement apparatus and method, the improved pellet inspection system also includes a pellet transfer apparatus and method which constitute the invention of the copending patent application cross-referenced above. Although the present invention and the cross-referenced invention are advantageously employed in the same pellet inspection system and, therefore, are both illustrated and described herein for facilitating a complete and thorough understanding of the present invention, it should be understood that the present and cross-referenced inventions can also be employed separately.

Accordingly, the present invention is directed to a pellet diameter inspection system which comprises: (a) means for aligning pellets end-to-end in a row along a common axis; (b) means for advancing the end-to-end aligned pellets along a linear path; and (c) a laser scanning apparatus for detecting and measuring the outside diameter of the pellets. The apparatus includes a laser beam light source and receiver disposed on opposite sides of the linear path in a non-orthogonal orientation to the common axis of the aligned pellets and operable for respectively emitting and receiving a laser beam emitted across the pellets along a directional path extending in a non-orthogonal orientation to the common axis of the pellets which will eliminate detection of adjacent ends of the pellets in the row.

More particularly, the laser scanning apparatus also includes a housing straddling the linear path and defining a cavity through which the pellets are advanced along the linear path. The housing extends in oblique relation to the linear path. The light source and receiver are mounted by the housing adjacent the opposite sides of the linear path. The directional path along which the laser beam is emitted extends at an acute angle within a range of approximately 58 to 60 degrees, and preferably 59 degrees, to the common axis of the pellets.

The present invention is also directed to a pellet inspection method which comprises the steps of: (a) aligning pellets end-to-end in a row along a common axis; (b) advancing the end-to-end aligned pellets along a linear path; and (c) scanning the aligned advancing pellets for detecting and measuring the outside diameter of the pellets by emitting a laser beam across the pellets along a directional path extending in a non-orthogonal orientation to the common axis of the aligned pellets so as to eliminate detection of adjacent ends of the pellets in the row. The directional path along which the laser beam is emitted extends at an acute angle within a range of approximately 58 to 60 degrees, and preferably 59 degrees, to the common axis of the pellets.

These and other features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the course of the following detailed description, reference will be made to the attached drawings in which:

FIG. 1 is a top plan view of a prior art pellet diameter inspection system employing a transfer apparatus in conjunction with a laser scanning apparatus for detecting oversize/undersize pellets as they are advanced past the laser scanning apparatus by the transfer apparatus from a grinding station to a pellet storage tray.

FIG. 2 is a side elevational view of the prior art pellet inspection system of FIG. 1.

FIG. 9 is a diagrammatic side elevational view of the pellet inspection system of FIG. 1 illustrating the operation of the transfer apparatus.

FIG. 10 is a diagrammatic side elevational view of an upward buckled condition produced in the row of pellets by the transfer apparatus.

FIG. 11 is a graph of the relationship between the different initial positions of individual pellets in the row thereof and the different velocity magnitudes of these individual pellets as they are transferred by the prior art transfer apparatus, shown in FIG. 9, past the laser scanning apparatus.

FIG. 12 is a side elevational view of an improved pellet diameter inspection system employing an improved laser scanning apparatus of the present invention in conjunction with an improved pellet transfer apparatus of the above cross-referenced invention for scanning pellets with a laser beam directed at a non-orthogonal relation to the axes of the pellets.

FIG. 13 is a top plan view of the improved inspection system as seen along line 13—13 of FIG. 12.

FIG. 21 is a diagrammatic side elevational view of the improved inspection system of FIG. 12, illustrating the improved transfer apparatus at the beginning of the forward stroke of its operation.

FIG. 22 is a diagrammatic side elevational view of the inspection system of FIG. 12, illustrating the transfer apparatus at the end of the forward stroke and beginning of the reverse stroke of its operation.

FIG. 23 is a diagrammatic side elevational view of the inspection system of FIG. 12, illustrating the transfer apparatus at the end of the return stroke of its operation.

DESCRIPTION OF THE PREFERRED EMBODIMENTS

Figure 3:
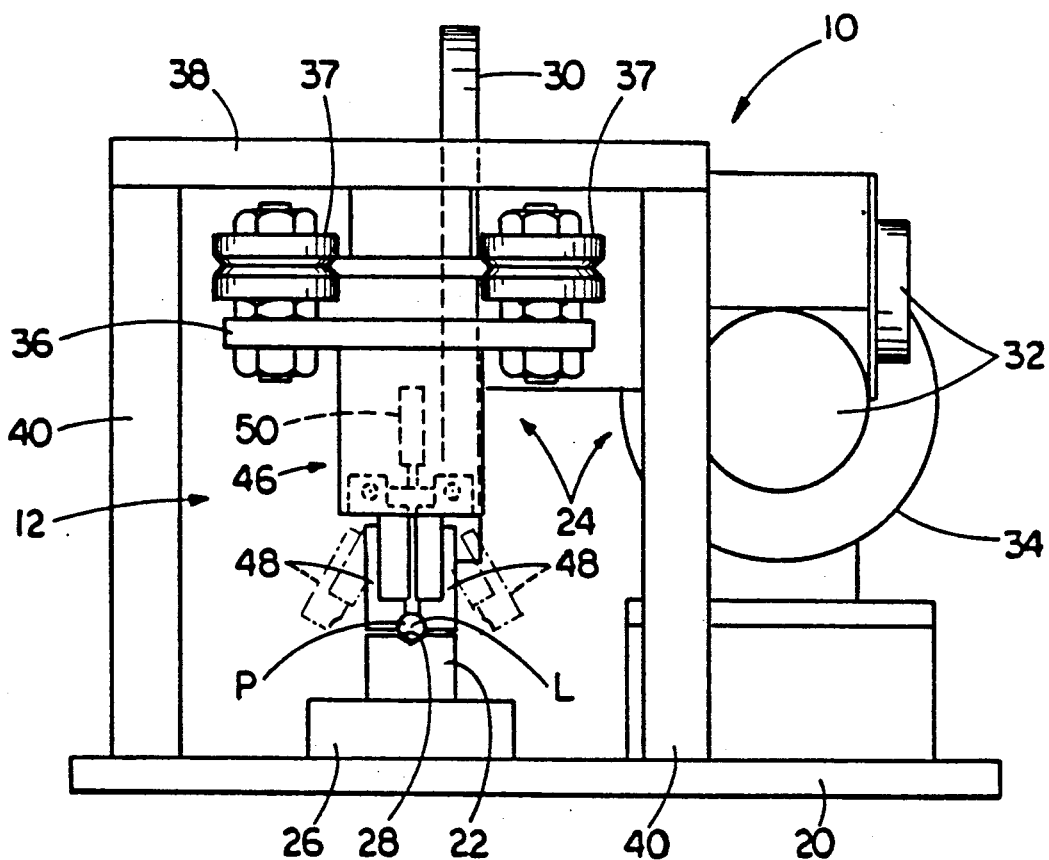
FIG. 3 is an enlarged end elevational view of the prior art pellet inspection system as seen along line 3—3 of FIG. 1, illustrating gripping and releasing positions of a gripping mechanism employed by the system.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Prior Art Pellet Diameter Inspection System

Referring now to the drawings, and particularly to FIGS. 1-3, there is shown a prior art pellet diameter inspection system, generally designated by the numeral 10. The prior art inspection system 10 basically employs a pellet transfer apparatus 12 in conjunction with a laser scanning apparatus 14. The scanning apparatus 14 scans pellets P (FIG. 9) with a laser beam B (FIG. 7) to measure and detect ones having oversized or undersized outside diameters concurrently as the pellets P are advanced, arranged end-to-end in a single file row, by the transfer apparatus 12. The pellets P are received from a location, such as from a feed conveyor 16 at the exit of a pellet grinding station (not shown) and discharged to a location, such as a pellet storage tray 18.

The transfer apparatus 12 basically includes a mounting platform 20, an elongated stationary support track 22, and a pellet transfer mechanism 24. The platform 20 extends generally horizontally and is stationarily disposed between the feed conveyor 16 and the storage tray 18. The stationary support track 22 is mounted upon the platform 20 by brackets 26 and has entry and exit ends 22A, 22B respectively adjacent the feed conveyor 16 and storage tray 18. The support track 22 also forms a linear guide channel 28 having a V-shape in cross-section which defines a linear path L extending from the entry end 22A to the exit end 22B of the track 22. The channel 28 of the support track 22 is capable of aligning and guiding pellets P in an end-to-end row along the linear path L with a common longitudinal axis of the pellets coincident with the linear path.

The pellet transfer mechanism 24 includes a flywheel 30 rotatably mounted to the output side of a gear box 32 which, in turn, is mounted to and driven by a suitable source of power, such as an electric motor 34, mounted on the platform 20. The transfer mechanism 24 also includes a carriage 36 supported by rollers 37 for horizontal reciprocable movement on a superstructure 38 mounted on the platform 20 by spaced inverted U-shaped brackets 40 above the pellet support track 22. The carriage 36 at an arm 42 thereof is pivotally interconnected by an elongated link 44 to the periphery of the flywheel 30.

Rotation of the flywheel 30 driven by operation of the motor 34 thus reciprocally drives the carriage 36 and a pellet gripper 46 mounted thereon through forward drive and reverse return strokes along the support track 22 and the linear path of the pellets P. Referring to FIG. 3, the gripper 46 has a pair of pivotally mounted fingers 48 which are actuatable between a closed gripping position, as seen in solid line form, and an open releasing position, as seen in dashed line form. The gripper 46 can be a commercial off-the-shelf unit, such as the one manufactured and marketed by the Arthur G. Russell Company under the commercial name "unigrip". The gripping fingers 48 are actuated between the gripping and releasing positions by retraction and extension of an air cylinder plunger 50 in the gripper 46 upon selected operation of the gripper.

Figure 4:
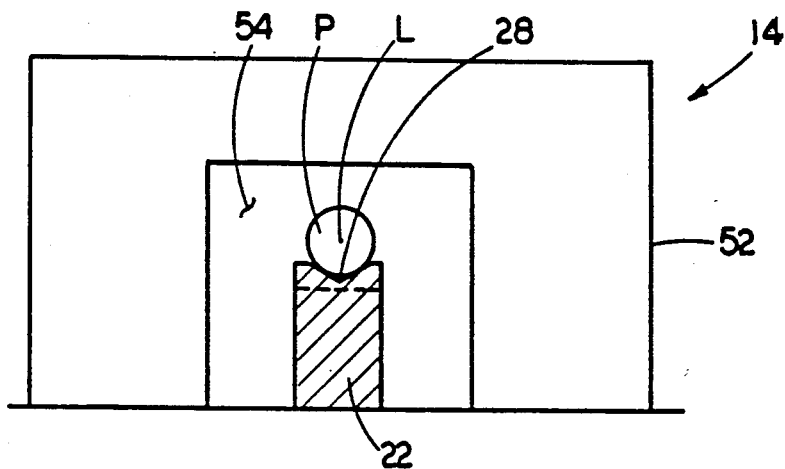
FIG. 4 is an enlarged end elevational view of the laser scanning apparatus of the system as seen along line 4—4 of FIG. 2.
Figure 5:
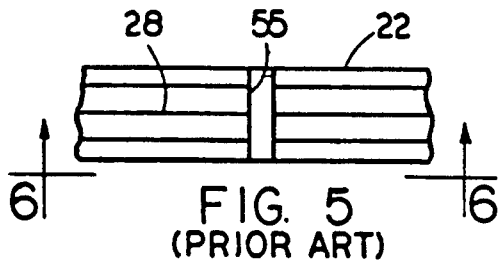
FIG. 5 is a top plan view of the portion of a support track of the transfer apparatus which extends through a housing of the laser scanning apparatus.
Figure 6:
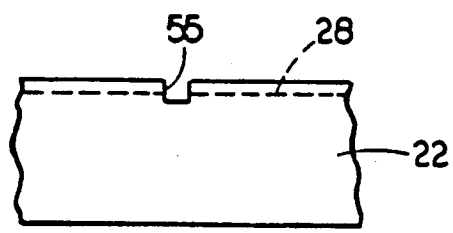
FIG. 6 is a side elevational view of the support track as seen along line 6—6 of FIG. 5.

Referring to FIGS. 4-8, there is illustrated the laser scanning apparatus 14 of the prior art inspection system 10 and a portion of the support track 22 associated with the laser scanning apparatus. As seen in FIG. 4, the laser scanning apparatus 14 includes a housing 52 which straddles the linear path L of the pellets P along the support track 22 and defines a cavity 54 through which the support track 22 extends and the pellets P are advanced by the pellet transfer mechanism 24 along the linear path. The laser scanning apparatus 14 can be any one of a number of suitable commercial off-the-shelf units, such as the one manufactured and marketed by Keyence Corporation under the commercial name Laser Scan Micrometer. As seen in FIGS. 5 and 6, the pellet support track 22 which extends through the housing 52 of the laser scanning apparatus 14 and has the linear channel 28 formed therein along which the pellets P are advanced, also includes a groove 55 formed transversely across and intersecting with the channel 28.

Figure 8:
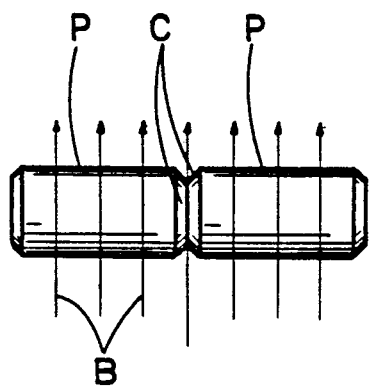
FIG. 8 is a top plan view of two pellets of the end-to-end row of pellets and illustrating the orthogonal orientation of the a common axis of the end-to-end pellets relative to the direction of the laser beam emitted across the pellets.
Figure 7:
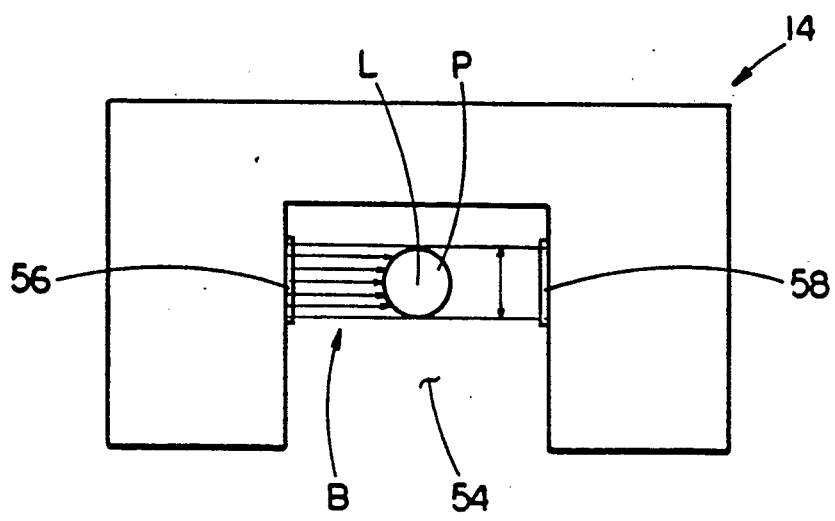
FIG. 7 is a view of the laser scanning apparatus similar to that of FIG. 4 illustrating the laser beam emitted by a light source and received by a receiver of the apparatus.
Figure 14:
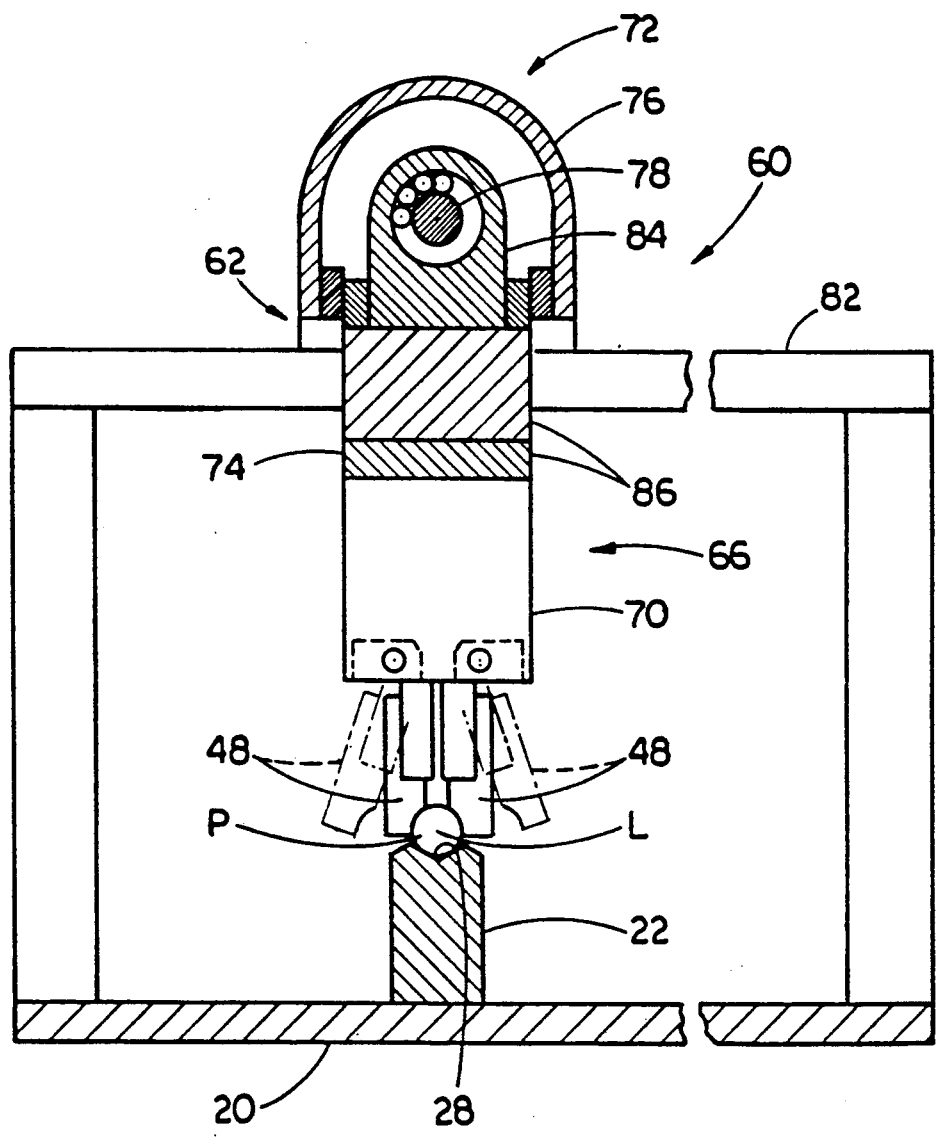
FIG. 14 is an enlarged transverse sectional view of the improved inspection system taken along line 14—14 of FIG. 12, illustrating gripping and releasing positions of the gripping mechanism employed by the improved inspection system.
Figure 15:
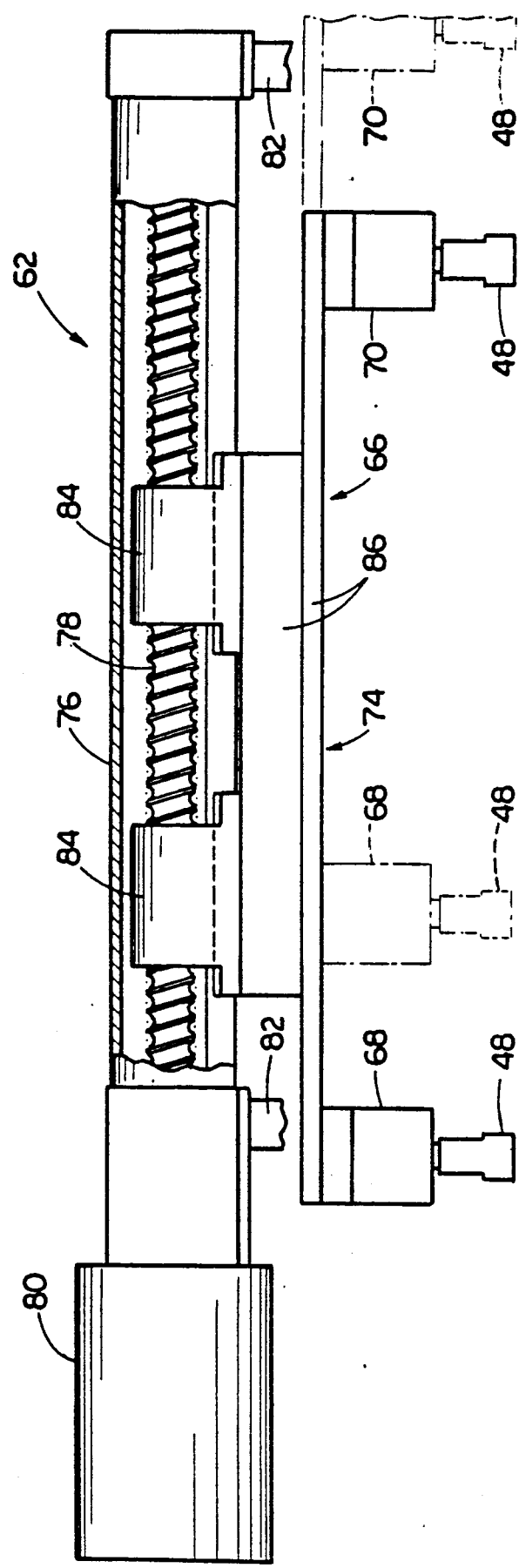
FIG. 15 is an enlarged fragmentary view, with portions broken away and sectioned, of the improved transfer apparatus of FIG. 12.
Figure 16:
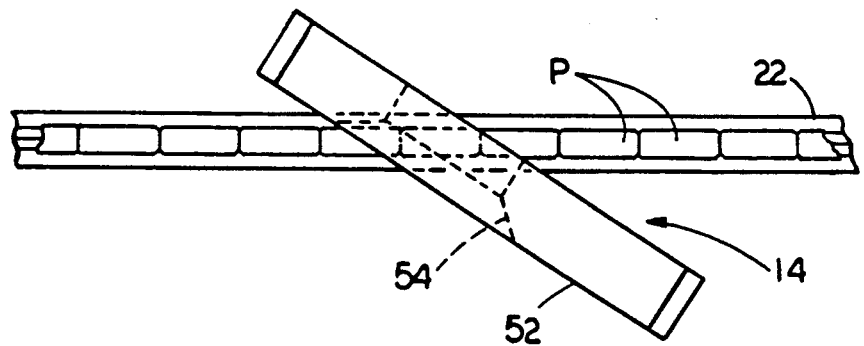
FIG. 16 is a fragmentary top plan view of the improved laser scanning apparatus as seen along line 16—16 of FIG. 12.

Referring to FIGS. 1, 2, 4 and 7, the housing 52 extends generally perpendicular or orthogonal to the linear path L defined by the support track 22. As shown in FIG. 7, the laser scanning apparatus 14 includes a light source 56 and a receiver 58. The light source 56 and receiver 58 are mounted to the housing 52 within and at opposite sides of the cavity 54 and adjacent the opposite sides of the linear path L. Thus, the directional path along which the laser beam B is emitted extends substantially orthogonally or approximately at a 90-degree angle to the linear path L of advancement of the pellets P in their end-to-end arrangement on the support track 22. The directional path of the laser beam B extends generally parallel to the transverse groove 55 in the track 22 for permitting a lower portion of the laser beam B to pass within the groove 55 below the pellets P from the light source 56 to the receiver 58. FIG. 8 depicts two of the pellets P in the end-to-end relation in the row and illustrates the orthogonal orientation of the common axis and linear path L of the pellets relative to the direction of the laser beam emitted across the pellets.

Referring to FIG. 9, the transfer mechanism 24 of the prior art inspection system 10 operates to cause its gripper 46 to grip a rearmost one of the pellets in the row to be advanced past the inspecting apparatus 14. The transfer mechanism 24 is moved from an initial position, shown in dashed line form, through a forward stroke to advance the row of pellets, in the direction of the arrow, along the linear path past the laser scanning apparatus 14. The laser scanning apparatus 14 detects and measures in a known manner the outside diameter of the pellets as they successively advance through the laser beam B and past the apparatus. As shown in FIG. 7, it is the height of the shadow cast by the pellet P within the laser beam B that is actually sensed and measured by the laser scanning apparatus 14. Further, the transfer mechanism 24 is operable to cause its gripper 46 to disengage or release from the one pellet and then move or retract through a return stroke relative to the now stationary advanced row of pellets back to the initial position.

The above-described construction of the prior art pellet diameter inspection system 10 has several significant drawbacks which affect its performance and efficiency. One drawback is the manner in which the pellets P are advanced along the support track 22. The transfer apparatus 24 has to push a long pellet row composed not only of the pellets to be scanned and measured, but also of the pellets which were just measured. This is to be accomplished by gripping the rearmost pellet adjacent the entry end 22A of the track 22. Pushing from the rear of the pellet row typically produces upward buckling of some of the pellets at the middle of the row. FIG. 10 illustrates the upward buckled condition produced in the row of pellets by the prior art inspection system 10. Such buckling results in inaccurate diameter measurements by the laser scanning apparatus 14 and a false indication of oversize pellets.

Another drawback is that the particular motion transmitting arrangement provided by the rotating flywheel 30, link 44, and carriage 36. The flywheel 30 rotates at a substantially constant velocity. However, the constant rotary motion of the flywheel 30 is converted into a reciprocable motion of the carriage 36 having a non-uniform or non-constant velocity. FIG. 11 is a graph of the relationship between the different initial positions of individual pellets P in the row thereof (with pellet 1 being the rearmost pellet) and the different velocity magnitudes of these individual pellets as they are advanced by the transfer apparatus 12 past the laser scanning apparatus 14. As depicted in FIG. 11, the pellets in the middle of the row move past the apparatus 14 at a substantially higher speed than the ones at the opposite ends such that the laser may only achieve one measurement for each middle pellet.

Thus, not all pellets move past the measuring laser scanning apparatus 14 at the same speed which diminishes the number of readings taken and thus the accuracy of the measurements. Since it only takes a localized oversize/undersize diameter condition on one of the pellets to cause problems in its subsequent insertion into the fuel rod and in increasing clad stresses, a decrease in the number of readings is just the opposite of what is desired.

A further drawback is that the laser beam B is aligned perpendicular to the axes and the direction of travel of the pellets P. Such orientation permits the chamfers C on the opposite ends of adjacent pellets P to show up as a reduced or undersize pellet diameter thereby giving false readings. Chamfers C may reduce a nominal diameter reading by as much as 40 mils when the scanning apparatus 14 emits a laser beam B perpendicular to the longitudinal axis of the pellet.

Improved Pellet Diameter Inspection System

Referring now to FIGS. 12-15, there is illustrated an improved pellet diameter inspection system, generally designated 60, which overcomes all of the above-described drawbacks of the prior art inspection system 10. The improved inspection system 60 employs an improved pellet transfer apparatus 62, constituting the invention of the above cross-referenced application, in conjunction with an improved laser scanning apparatus 64 of the present invention for advancing pellets P at a constant velocity and scanning the pellets with a laser beam B directed in a non-pellets orthogonal orientation to the common axis of the pellets. The transfer apparatus 62 and laser scanning apparatus 64 are both mounted on the same platform 20 as before located between the grinding station exit feed conveyor 16 and the pellet storage tray 18.

The improved transfer apparatus 62 of the cross-referenced invention utilizes the same stationary support track 22 having the same linear guide channel 28 as employed in the prior art transfer apparatus 24. As before, the channel 28 of the stationary track 22 aligns and guides pellets in an end-to-end row along the linear path L.

However, the improved transfer apparatus 62 now includes a transfer mechanism 66 which differs substantially from the transfer mechanism 24 of the prior art transfer apparatus 24. First of all, the transfer mechanism 66 includes a pair of spaced grippers 68, 70, each operable between pellet gripping and releasing positions, as seen in respective solid and dashed line forms in FIG. 14. Although each of the grippers 68, 70 is per se the same unit as the single gripper 46 used in the prior art transfer apparatus 24, the use of the two grippers 68, 70 in spaced arrangement shown in FIG. 15 eliminates the drawback associated with the use of only the single gripper 64. In particular, the use of the pair of grippers 68, 70 eliminates the pellet buckling problem and the resultant mistaken readings of oversized/undersized pellets by now reducing the length of a pellet row being pushed in front of the laser 64 to a maximum of about ten inches by the one gripper 68, whereas, the other gripper 70 pushes the bulk of the pellets through the most turbulent motion onto the loading tray 18 (which may exceed twenty four inches of pellets, back to back). As a result, those pellets being lasered are sheltered from turbulence which cause inaccurate laser measurements.

The transfer mechanism 66 is operable to move the grippers 68, 70 through forward and return or reverse strokes from and to an initial position, seen in FIG. 12. The pellets are advanced by the transfer mechanism 66 past the laser scanning apparatus 64 at a uniform or constant first velocity and then the grippers 68, 70 are returned by the transfer mechanism 66 to the initial position at a second velocity greater than the first velocity. The constant forward velocity permits the same number of multiple measurements to be taken with respect to each pellet passing the laser scanning apparatus 64 and thereby provide improved measurement performance of the inspection system 60. The greater return velocity decreases the amount of time it takes to reset the transfer mechanism 66 to the initial position, during which interval pellets are not moving and therefore measurements are not being done, so as to achieve a higher level of measurement efficiency than heretofore.

Additionally, the transfer mechanism 66 includes a driver 72 for moving the grippers 68, 70 and a carrier 74 mounting the grippers 68, 70. The driver 72 mounts the carrier 74 for movement along the linear path L and is operable to move the carrier 74 and the pair of grippers 68, 70 mounted from the carrier through the forward stroke at the constant first velocity and through the return stroke at the second velocity.

The driver 72 of the transfer mechanism 66 can be any one of several suitable devices. However, one preferred device is a driver 72 having an elongated tubular hollow housing 76, an elongated externally-threaded feed screw 78 rotatably mounted at its opposite ends in opposite ends of the housing 76, and a source of power, such as an electric motor 80, mounted at one end of the housing 76 and drivingly coupled to the corresponding one end of the rotatable feed screw 78. The housing 76 extends between and is supported above the platform 20 and the support track 22 by a pair of spaced upstanding inverted U-shaped brackets 82 mounted on the platform 20. The feed screw driver 72 can be any one of a number of suitable commercial off-the-shelf units, such as the one manufactured and marketed by Microslide under the commercial name Compact Electro-Slide.

The carrier 74 of the transfer mechanism 66 is mounted on and drivingly coupled to the threaded feed screw 78 of the driver 72. Specifically, the carrier 74 includes a pair of spaced internally threaded couplers 84 threadably installed on the externally threaded feed screw 78 and an elongated support plate 86 attached to the lower side of the couplers 84 and, in turn, mounting the pair of spaced grippers 68, 70 below the plate 86. Thus, rotation of the feed screw 78 by the motor 80 in one directional sense causes movement of the carrier 74 and grippers 78, 80 through the forward stroke along the linear path at the constant first velocity, whereas rotation of the feed screw 78 by the motor 80 in the opposite directional sense causes movement of the carrier 74 and grippers 78, 80 through the reverse or return stroke at the second velocity. Through adjustment of a variable speed controller (not shown) associated with the feed screw driver 72, the operating speed of the driver can be set such that the second velocity of the carrier 74 during the return stroke is substantially greater than the first velocity of the carrier 74 during the forward stroke.

As mentioned above, the use of the pair of grippers 68, 70 eliminates the pellet buckling problem and the resultant mistaken readings of oversized/undersized pellets by reducing by about one-half the length of pellets being pushed by a single gripper. The grippers 68, 70 are mounted to the carrier 74 such that when the transfer mechanism 66 is at the initial position, as seen in FIGS. 12 and 21, the first, or rear, gripper 68 is located adjacent to a rearmost one of the pellets in a trailing row TR to be advanced along the linear path and scanned by the laser scanning apparatus 64 (providing an inspecting station) and the second, or front, gripper 70 is spaced forwardly along the path from the first gripper 68 and located adjacent to a rearmost one of the pellets in a leading row LR previously advanced along the linear path and scanned by the laser scanning apparatus 64.

In particular, by use of suitable controls (not shown) connected to the transfer mechanism 66, the second gripper 70 is actuated from its releasing to gripping position before the first gripper 68 is actuated from its releasing to gripping position. Also, movement of the carrier 74 from the initial position along the forward stroke is started before the first gripper 68 is so actuated such that the leading, previously scanned row LR of pellets is first moved by the front gripper 70 before the trailing row TR of pellets to be scanned is moved thereby producing a gap 88, as seen in FIG. 22, between the previously advanced and scanned row LR of pellets and the row TR of pellets to be advanced and scanned. The presence of the gap 88 reduces the tendency of the pellets in the trailing row TR to buckle due to engagement with the leading pellet row LR.

Figure 18:
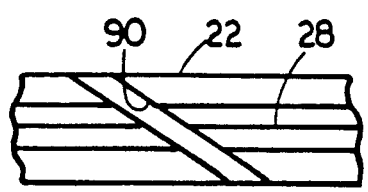
FIG. 18 is a top plan view of the support track as seen along line 18—18 of FIG. 17.
Figure 17:
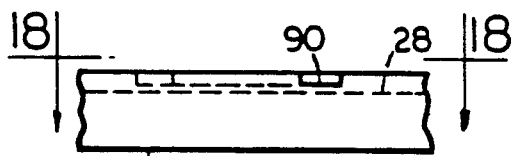
FIG. 17 is a side elevational view of the portion of a support track of the transfer apparatus which extends through a housing of the laser scanning apparatus.
Figure 19:
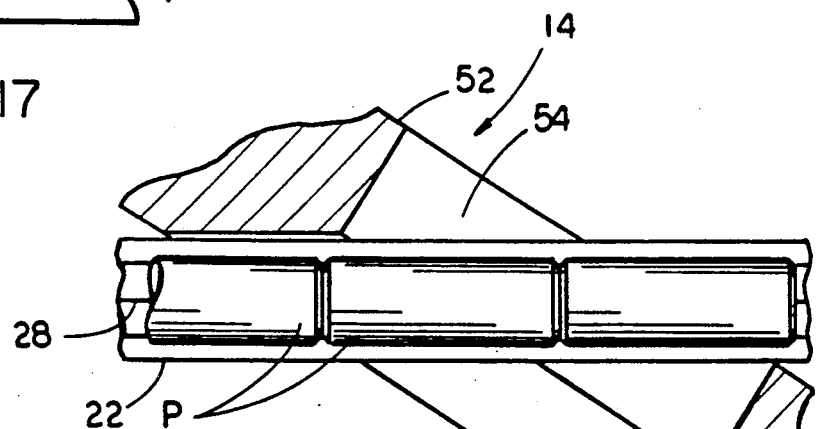
FIG. 19 is an enlarged fragmentary top plan view, with portions broken away and sectioned, of the laser scanning apparatus and the support track.
Figure 20:
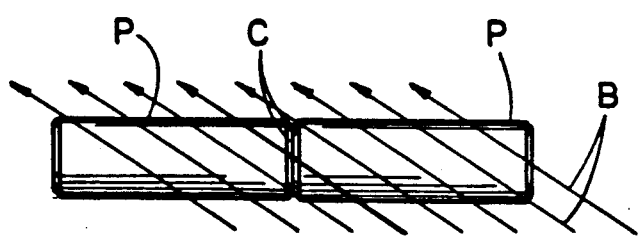
FIG. 20 is a top plan view of two pellets of the end-to-end row of pellets and illustrating the non-orthogonal orientation of a common axis of the end-to-end pellets relative to the direction of the laser beam emitted across the pellets.

FIGS. 16–19 illustrate the laser scanning apparatus 64 of the present invention employed by the improved pellet inspection system 60 in conjunction with the pellet support track 22. The laser scanning apparatus 64 can be the same unit as employed by the prior art scanning apparatus 14. Specifically, laser scanning apparatus employs the same housing 52 having the cavity 54 and the same light source 56 and receiver 58 disposed on opposite sides of the linear path L. However, as now seen in FIGS. 16 and 19, the housing 52 extends in oblique relation to the track 22, and as seen in FIG. 20, the light source 56 emits a laser beam B in a non-orthogonal orientation to the common axis of the aligned pellets P. The preferred angle of the non-orthogonal orientation is such as will eliminate detection of the adjacent ends of the pellets containing the chamfers C. For example, in the case of the chamfers C on the ends of the pellets P, the directional path along which the laser beam is emitted extends at an acute angle within a range of approximately 58 to 60 degrees to the common axis of the pellets. The preferred angle is approximately 59 degrees to the common axis of the pellets. For permitting passage of a portion of the laser beam B under the pellets, as seen in FIG. 17–19, the groove 90 in the support track 22 extends across the track at the same non-orthogonal angular relationship as the laser beam.

FIGS. 21–23 illustrate sequential stages of the operation of the improved pellet inspection system 60 employing the improved pellet transfer apparatus 62 and the improved orientation of the laser scanning apparatus 64. FIG. 21 illustrate the transfer apparatus 62 in its initial position at the beginning of the forward stroke of its operation. In the initial position, the first gripper 68 is located adjacent to a rearmost one of the pellets in the trailing row TR and the second gripper 70 is located adjacent the rearmost pellet in the leading row LR.

As described earlier, at the start of the operation, the transfer mechanism 62 is operated to actuate the second gripper 70 from its releasing to gripping position before actuating the first gripper 68 from its releasing to gripping position and the carrier 74 is started moving so as to advance both grippers 68, 70 from the initial position along the forward stroke a short distance before the first gripper 68 is actuated to grip its rearmost pellet. Such operation produces the gap 88 between the trailing and leading rows TR, LR so as to prevent buckling of pellets in the trailing row.

FIG. 22 illustrates the transfer apparatus 62 after reaching the end of the forward stroke and now beginning the reverse stroke of its operation. The grippers 68, 70 are now actuated to their respective releasing positions, disengaging from the respective pellets so that the rows of pellets remain stationary as the transfer mechanism 66 returns to the initial position. FIG. 23 illustrates the transfer apparatus 62 at the end of the return stroke of its operation. It will be noted that an auxiliary air cylinder stopping mechanism 92 is provided adjacent the entry end 22A of the support track 22. When the transfer mechanism 66 is operated to advance the pellets, the stopping mechanism 92 is activated to engage the leading pellet on the feed conveyor 16 and retain the leading pellet in a stationary position thereon, preventing it from moving onto the support track. The stopping mechanism 92 is deactivated to release the leading pellet once the transfer mechanism 66 reaches the end of its forward stroke.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the forms hereinbefore described being merely preferred or exemplary embodiments thereof.

We claim:

1. A pellet diameter inspection system, comprising:
   (a) means for aligning pellets end-to-end in a row along a common axis;
   (b) means for advancing the end-to-end aligned pellets along a linear path; and
   (c) a laser scanning apparatus for detecting and measuring the outside diameter of the pellets, said apparatus including a laser beam light source and receiver disposed on opposite sides of said linear path in a non-orthogonal orientation to said common axis of the aligned pellets and operable for respectively emitting and receiving a laser beam emitted across the pellets along a directional path extending in a non-orthogonal orientation to said common axis of the pellets which will eliminate detection of adjacent ends of the pellets in the row.

2. The pellet inspection system as recited in claim 1, wherein said laser scanning apparatus also includes a housing straddling said linear path and defining a cavity through which the pellets are advanced along said linear path.

3. The pellet inspection system as recited in claim 2, wherein said housing extends in oblique relation to said linear path.

4. The pellet inspection system as recited in claim 3, wherein said light source and receiver are mounted by said housing adjacent said opposite sides of said linear path.

5. The pellet inspection system as recited in claim 1, wherein the directional path along which said laser beam is emitted extends at an acute angle within a range of approximately 58 to 60 degrees to said common axis of the pellets.

6. The pellet inspection system as recited in claim 1, wherein the directional path along which said laser beam is emitted extends at an angle of approximately 59 degrees to said common axis of the pellets.

7. The pellet inspection system as recited in claim 1, wherein said aligning means is a support track having a linear channel formed therein defining said linear path, said track having a groove formed across said channel and extending generally parallel to the directional path of said laser beam for permitting a portion of said laser beam to pass across said path below the pellets from said light source to said receiver.

8. A pellet diameter inspecting method, comprising the steps of:
  (a) aligning pellets end-to-end in a row along a common axis;
  (b) advancing the end-to-end aligned pellets along a linear path; and
  (c) scanning the aligned advancing pellets for detecting and measuring the outside diameter of the pellets by emitting a laser beam across the pellets along a directional path extending in a non-orthogonal orientation to said common axis of the aligned pellets so as to eliminate detection of adjacent ends of the pellets in the row.

9. The pellet inspecting method as recited in claim 8, wherein the directional path along which said laser beam is emitted extends at an acute angle within a range of approximately 58 to 60 degrees to said common axis of the pellets.

10. The pellet inspecting method as recited in claim 8, wherein the directional path along which said laser beam is emitted extends at an angle of approximately 59 degrees to said common axis of the pellets.

11. The pellet inspecting method as recited in claim 8, wherein said laser beam is emitted past the pellets in the non-orthogonal orientation both above and below the pellets.

* * * * *